ly unsaturated monomers and are character-
ised by containing a 1-olefine heat-reaction product
which has been made by a free-radical polymerisation
of a normally liquid 1-olefine having from 6 to 22 car-
bon atoms until the product has a non-volatile content
of from 1% to 60%. The copolymers are useful in the
field of surface coatings.

United States Patent [19]
Spoor et al.

[11] 3,954,720
[45] May 4, 1976

[54] COPOLYMERISATION PROCESS AND PRODUCT

[75] Inventors: Joseph Spoor; Alan Cunningham, both of London, England

[73] Assignee: Berger, Jenson & Nicholson Limited, London, England

[22] Filed: Apr. 5, 1974

[21] Appl. No.: 458,454

Related U.S. Application Data

[63] Continuation-in-part of Ser. Nos. 231,409, March 2, 1972, abandoned, and Ser. No. 231,410, March 2, 1972, abandoned.

[30] Foreign Application Priority Data

Mar. 15, 1971 United Kingdom............... 6851/71
Mar. 15, 1971 United Kingdom............... 6852/71

[52] U.S. Cl.................................. 526/75; 526/78;
526/82; 526/79; 526/318; 526/320; 526/324;
526/325; 526/329; 526/330; 526/342;
526/347; 526/350

[51] Int. Cl.²............... C08F 210/14; C08F 212/08

[58] Field of Search............ 260/78.5 R, 78.5 E, 260/80.73, 80.75, 80.78, 878 B, 683.15, 86.7, 88.1 PE, 80.3 N, 80.3 E

[56] References Cited
UNITED STATES PATENTS

| | | | |
|---|---|---|---|
| 2,542,542 | 2/1951 | Lippincott et al. | 252/56 |
| 2,551,638 | 5/1951 | Seger et al. | 260/683.15 |
| 2,626,945 | 1/1953 | Carlin | 260/86.7 |
| 2,937,129 | 5/1960 | Garwood | 260/683.15 |
| 3,755,272 | 8/1973 | Blank | 260/80.78 |

*Primary Examiner*—John Kight, III
*Attorney, Agent, or Firm*—Wenderoth, Lind & Ponack

[57] ABSTRACT

Random copolymers are derived from a variety of eth-
ylenically unsaturated monomers and are character-
ised by containing a 1-olefine heat-reaction product
which has been made by a free-radical polymerisation
of a normally liquid 1-olefine having from 6 to 22 car-
bon atoms until the product has a non-volatile content
of from 1% to 60%. The copolymers are useful in the
field of surface coatings.

8 Claims, No Drawings

COPOLYMERISATION PROCESS AND PRODUCT

This application is a continuation-in-part of our earlier applications Ser. Nos. 231,409 and 231,410, both applications filed Mar. 2, 1972 and now both are abandoned.

In the field of surface coatings, such as paints and lacquers, for example, it is well-known to prepare thermoplastic copolymers containing reactive hydroxyl groups, optionally containing reactive carboxyl groups also, by copolymerising beta-hydroxy ethyl or propyl acrylate or methyacrylate with other ethylenically unsaturated co-monomers and to blend such thermoplastic copolymers with cross-linking agents such as aminoplasts, phenoplasts, poly-epoxide resins and poly-isocyanate resins to provide hard and durable crosslinked coatings which are useful in coatings for example for refrigerators, washing machines and motor cars. It is also well known to prepare thermosetting copolymers containing for example reactive amide or substituted amide groups.

One disadvantage of known cross-linked coatings derived from acrylic esters is that their resistance to certain chemicals, especially alkalis, is somewhat limited, this arising from the presence of sensitive ester linkages in the coatings. For this reason, among others, it is known to incorporate in acrylic copolymers major amounts of styrene, a monomer characteristically resistant to chemicals, but copolymers which contain substantial amounts of styrene tend to show brittleness. Another type of ethylenically unsaturated monomer capable of forming homo-polymers lacking sensitive ester groups is the class of 1-olefines, by which is meant the mono-alkyl substitution products of ethylene in which the alkyl carbon chain is straight or branched.

When however attempts are made to incorporate 1-olefine into acrylic type copolymers in order to reduce the amount of sensitive ester groups present, by known methods by heating in the presence of free-radical generating initiator at atmospheric pressure, unsatisfactory percentage conversion figures are obtained. For example, an acrylic copolymer of known type was prepared by heating 16 parts hydroxy propyl methacrylate, 0.6 parts methacrylic acid, 60.4 parts of styrene and 23 parts of 2-ethyl hexyl acrylate in solution in xylene at 140°C in the presence of 1 percent by weight of peroxide initiator and 99 percent of the monomers originally present became converted into copolymer. In contrast when the 2-ethyl hexyl acrylate in the above recipe had been replaced by a typical 1-olefine of high purity, namely 1-dodecene and a similar procedure followed only 80 percent by weight conversion of monomers to copolymer was obtained. This unsatisfactory result may be attributed to the low copolymerisability under free-radical generating conditions of 1-olefine monomers.

By reducing the percentage of 1-olefine monomer present and making various modifications in the procedure as previously practised in the art it was possible to attain percentage conversion figures in the range 79.5 to 90.

For a copolymerisation process to be acceptable a percentage conversion figure of at least 90 or 95 and more usually at least 97 is normally required, though a gain in yield from a copolymerisation process is useful at any practicable level.

In order to overcome this difficulty attempts have been made to copolymerise 1-olefines with other ethylencally unsaturated monomers using free-radical generating initiator in large amounts much larger than the catalytic amounts usually employed in copolymerisation reactions. Percentage conversion figures by such methods however leave much to be desired. Moreover, apart from the high cost of initiator compounds, significant amounts of residue from them remaining in the product adversely affect the properties, such as by reducing chemical resistance.

Surprisingly it has now been found that 1-olefines which have been heated in the presence of a catalytic amount of free-radical generating initiator, whereby the amount of volatile material becomes reduced, have improved copolymerisability with other ethylenically unsaturated compounds under free-radical generating conditions.

It is known that 1-olefines can be polymerised using ionic catalysts of the Friedel-Crafts type. However, the resulting polymers contain ionic species which are difficult and expensive to remove, and which may interfere with any subsequent free-radical co-polymerisation system involving the polymers. By contrast, the heat reaction products used in this invention will normally be substantially free of residues derived from ionic catalysts. The distinction between free-radical generating polymerisation iniators and ionic catalysts is well understood in the art of polymerising ethylenically unsaturated compounds.

The present invention accordingly provides a random copolymer consisting essentially of units of:

1. 1 to 25% of a 1-olefine heat reaction product, made by heating one or more normally liquid 1-olefines having from 6 to 22 carbon atoms per molecule in the presence of from 0.5 to 10% by weight on the heat reaction product of one or more free-radical generating polymerisation initiators until the product has a nonvolatile content, determined at the mid-distillation point of the 1-olefine, or at 250°C, whichever is lower, of from 1 to 60 parts by weight per 100 parts by weight of heat-reaction product;

2. 0 to 25% of a monomer selected from the group consisting of acrylamide, methacrylamide and N-alkylol derivatives thereof, and hydroxyethyl and hydroxypropyl acrylates and methacrylates and mixtures thereof;

3. 0 to 8% of an ethylenically unsaturated monomer selected from the group consisting of mono- and dicarboxylic acids, mono-esters of dicarboxylic acids with $C_1$ to $C_{10}$ aliphatic or cycloaliphatic monohydric alcohols, nitriles of monocarboxylic acids and mixtures thereof;

4. 0 to 60% of a monomer selected from the group consisting of styrene, vinyl toluene, vinylacetate and mixtures thereof;

5. the balance consisting of one or more copolymerisable monomers selected from the group consisting of esters of acrylic and/or methacrylic acids with $C_1$ to $C_{10}$ aliphatic or cycloaliphatic monohydric alcohols and mixtures thereof;

the percentages of the components 1 to 4 being by weight on the weight of the copolymer.

We have found that the di-esters of maleic and/or fumaric and/or itaconic acids with $C_1$ to $C_{10}$ aliphatic or cycloaliphatic alcohols can be used to replace the acrylate and methacrylate esters of component (5) either wholly or in part. Thus the invention includes a random copolymer consisting essentially units of:

1. 1 to 25% of a 1-olefine heat-reaction product, made by heating one or more normally liquid 1-olefine, having from 6 to 22 carbon atoms per molecule, in the presence of from 0.5 to 10% by weight on the heat-reaction product of one or more free-radical generating polymerisation initiators, until the product has a non-volatile content, determined at the mid-distillation point of the 1-olefine, or at 250°C, whichever is lower, of from 1-60 parts by weight per 100 parts by weight of heat-reaction product;

2. 0 to 8% of a monomer selected from the group consisting of acrylamide, methacrylamide and N-alkylol derivatives thereof, and hydroxyethyl and hydroxypropyl acrylates and methacrylates and mixtures thereof;

3. 0 to 25% of an ethylenically unsaturated monomer selected from the group consisting of mono- and di-carboxylic acids, mono-esters of dicarboxylic acids with $C_1$ to $C_{10}$ aliphatic or cycloaliphatic monohydric alcohols, nitriles of monocarboxylic acids and mixtures thereof;

4. 0 to 60% of a monomer selected from the group consisting of styrene, vinyl toluene, vinyl acetate and mixtures thereof;

5. the balance consisting of one or more copolymerisable monomers selected from the group consisting of esters of acrylic and methacrylic acids, and diesters of maleic, fumaric and itaconic acids with $C_1$ to $C_{10}$ aliphatic cycloaliphatic monohydric alcohols, and mixtures thereof; the percentages of the components 1 to 4 being by weight on the weight of the copolymer.

The present invention also provides a method of making these copolymers by reacting the components (1) to (5) together in the presence of free-radical-generating polymerisation initiator added gradually during the course of the reaction.

The present invention also provides a coating composition comprising a mixture, in an inert diluent, of a copolymer of the invention and a cross-linking agent therefor; and articles carrying a cured coating of the copolymer of the invention cross-linked either by means of reactive groups copolymerised into the copolymer and/or by means of a cross-linking agent selected from urea-, melamine-, and phenol-formaldehyde condensates, alkyl melamines, poly-epoxy compounds and poly-isocyanate condensates.

As used herein the term "1-olefine" is defined to mean normally liquid 1-olefines having from 6 to 22 carbon atoms per molecule. The alkyl substituent of the 1-olefine may be straight, that is to say 'normal', or branched and contains between 4 to 5 and 20 carbon atoms and which therefor 1-olefines from 1-hexane or 1-heptene to 1-docosene are included. Mixtures of two or more 1-olefines are included within the definition.

As used herein the term "heat-reaction product" is defined to mean the product obtained by heating one or more 1-olefine, as defined above, in the presence of from 0.5 to 10% of one or more free-radical generating polymerisation initiators by weight based on the total of 1-olefine and initiator, until the non-volatile content determined at the mid-distillation point of the 1-olefine or at 250°C whichever is the lower is from 1 to 60 parts by weight of per 100 parts by weight of the heat-reaction product. The initiator is preferably a peroxide e.g. di-tertiarybutyl peroxide and di-benzoyl peroxide.

The precise chemical nature of the 1-olefine heat-reaction product is not known with certainty, but the heat reaction product is believed to consist of a mixture of unreacted 1-olefine and relatively low molecular weight polymers of the 1-olefine. We think that the volatile portion of the heat-reaction product is almost entirely unreacted 1-olefine monomer, and that the non-volatile component is mostly dimer with smaller quantities of trimer, tetramer and possibly higher oligomers. The relative proportions of the various components of the heat-reaction product will clearly depend upon the non-volatile content.

Suitable ethyleneically unsaturated mono- and dicarboxylic acids are acrylic, methacrylic, itaconic, maleic and fumaric acids. Maleic anhydride may be used. Examples of suitable esters are methyl acrylate, butyl acrylate and 2-ethyl hexyl acrylate.

The copolymers of the present invention may be prepared by solution co-polymerisation in the presence of free-radical generating initiator, preferably also in the presence of chain transfer agent. The free-radical generating initiator, which is used in a catalytic amount, that is to say from about 0.5 to about 6.0 percent, more usually from about 1.0 to about 3.0 percent by weight of the total reactants, may be di-tertiary butyl peroxide. The initiator should be added gradually during the course of the copolymerisation reaction, either by continuous 'drip-feed' during part or all of the reaction time or by incremental additions or by a combination of such methods.

When required, suitable chain-transfer agents are mercaptans, for example tertiary dodecyl mercaptan and lauryl mercaptan. The amount added is in the range 0.02 to 2.0 percent, more usually 0.3 to 1.0 percent by weight based on the total weight of monomers and is selected with a view to controlling the average molecular weight of the copolymer to impart an acceptable workable viscosity to a solution of the compolymer in an organic solvent at about 50 – 60 percent solid content in 100 parts by weight of solution. It is well-known in the art that the amount of chain-transfer agent to be used may be critical.

In a preferred method for making the copolymer the heat-reaction product is charged into a reaction vessel and heated to the reaction temperature which normally lies in the range of 80° to 160°C. However, for systems including vinyl acetate which boils at ~71°C reaction temperatures may need to be reduced. The other monomers, having been mixed together as a separate operation with some inert organic solvent such as xylene and at least about 0.5 percent of initiator, are then added gradually as a drip-feed over a period of several hours. Heating is then continued, preferably with incremental additions of catalyst at intervals of 1 to 2 hours until a test sample of the reaction mixture, removed and tested for solid content by known methods, indicates a value approaching 100% conversion. (Heating times are frequently in the range of 1 to 24 hours). The reaction mixture is then cooled and further additions of inert organic solvent made as required.

The proportions and types of the other co-reactants to be selected are determined by the purpose for which the copolymer is to be used and are adjusted according to methods known in the art to provide the desired balance between hardness, flexibility and chemical resistance in the final coating together with good adhesion.

The copolymers of the present invention are random copolymers, by which is meant that the various components of the starting reaction mixture (which are all monomeric except for the heat-reaction product, which contains a proportion of oligomer) are joined together in the copolymer in a random order. We believe that the oligomeric part of the heat-reaction product incorporated into the copolymer does so via a terminal unsaturation, thus behaving as a 1-olefine monomer with a large pendant group.

The copolymers of the present invention may be either thermoplastic or thermosetting. Thermosetting copolymers can be made by including acrylamide or methacrylamide in the monomers used. Thermoplastic copolymers can be cured using conventional curing agents as is described below. Even though copolymers containing acrylamide and/or methacrylamide and/or their N-alkylol derivatives are entirely thermosetting in their own right it is common practice to include additionally a curing agent in compositions containing the copolymer to improve the adhesion, hardness and alkali resistance of the cured film. N-alkylol acryl-amide and methacrylamide may be used per se as starting materials or generated in situ in the reaction medium e.g. by reaction of acrylamide or methacrylamide with butanol/formaldehyde included in the reaction mixture.

Alpha-olefines are prepared by processes which produce as primary products mixtures of many different olefinic materials including materials gaseous at ordinary temperature through to solid materials. A given mixture of 1-olefines may be largely separated into individual 1-olefines, or into close boiling-range fractions containing mixtures of 1-olefines with similar boiling points, by distillation. Commercial high purity 1-olefines usually distil over ranges from first distillation temperature to final distillation temperature which vary from about 10°C for 1-heptene to about 40°C for 1-heptadecene. Commercially available close-boiling fractions may distil over a range of from about 50°C for a $C_6 - C_7$ fraction to about 90°C for a $C_9 - C_{10}$ fraction and correspondingly wider ranges for high boiling fractions. Preferably for the present invention the difference between the first and final distillation temperatures of the alpha-olefine mixture selected does not exceed about 100°C.

The commercially available mixtures consist mainly of normal 1-olefines but may contain minor amounts of branched chain 1-olefines and also of olefines which have an ethylenically unsaturated group within the chain rather than in the alpha position.

Some alpha-olefines which are suitable for use in this invention are listed in Table 1, together with an approximate indication of their average first and last distillation temperature determined by well known methods, and mid-distillation temperatures derived from them as the arithmetic mean.

Table 1

| | First Distillation Temp. °C. | Final Distillation Temp. °C. | Mid-Distillation Temp. °C. |
|---|---|---|---|
| Hexene-1 | 59 | 67 | 63 |
| Heptene-1 | 90 | 120 | 105 |
| Octene-1 | 118 | 135 | 127 |
| Nonene-1 | 140 | 160 | 150 |
| Decene-1 | 154 | 195 | 180 |
| Undecene-1 | 185 | 205 | 195 |
| Dodecene-1 | 207 | 245 | 226 |
| Tridecene-1 | 225 | 260 | 242 |
| Tetradecene-1 | 243 | 270 | 257 |
| Pentadecene-1 | 260 | 280 | 270 |
| Hexadecene-1 | 270 | 310 | 290 |
| Heptadecene-1 | 300 | 335 | 317 |
| Octadecene-1 | Beyond scope of normal methods. | | |

The actual mid-distillation temperature varies somewhat between 1-olefines from one source of supply and another and is to be determined, likewise the general suitability of a given sample of 1-olefine, by practical trail. As a general guide the 1-olefine should be substantially free from substances which might unduly inhibit free-radical polymerisation, such as sulphur compounds and added oxidation inhibitor. Sulphur compounds preferably should not exceed a few parts per million and aromatic, naphthenic, acetylenic and di-olefine compounds should preferably be absent.

The free-radical-generating initiator should be selected to generate free radicals at a heating temperature appropriate to the 1-olefines used. Di-tertiary butyl peroxide for example, is suitable for heating temperatures in the range of 130° to 200°C. Our preferred initiators are di-tertiary butyl peroxide and di-cyclohexyl perdicarbonate.

Other initiators which may be used include organic peroxides, hydroperoxides and per-acids and esters thereof, for example, tertiary butyl perbenzoate, benzoyl peroxide, cumene hydroperoxide and di-tertiary butyl peroxide. Azonitrile initiators, for example, azo-bis-iso-butyro nitrile may also be used. The initiator is normally used in a catalytic amount, by which is meant between about 0.5 and about 6 parts, more usually from 1.4 to 5.6 parts by weight per 100 parts by weight of 1-olefine monomer but the invention also envisages the use of amounts up to 10 parts by weight of initiator per 100 parts by weight of 1-olefine monomer in special cases.

In the preferred method of preparing the heat-reaction product, the 1-olefine monomer is charged into a reaction vessel equipped with reflux condenser, thermometer, stirrer and means for making liquid additions during the course of the reaction and heated with stirring to a temperature in the range of 50°C to 250°C, more usually in the range of 60°C to 200°C, the reaction temperature being selected having regard to the distillation range and reactivity of the 1-olefines used. When the desired temperature is reached addition of initiator may be commenced as drip-feed which continues through the course of the reaction. Alternatively all the initiator may be added to the reaction vessel at the commencement of the reaction. Organic solvent of a substantially inert type may be present during the reaction if desired. The heating time will generally be within the range of 5 minutes to 24 hours. The progress of the reaction is followed by determining the non-volatile content of small test samples removed for the purpose, heating being discontinued when the desired value has been reached.

The reaction may be effected in an atmosphere of inert gas if desired.

For 1-olefine starting materials having 6 to 13 carbon atoms in the molecule the non-volatile contents are determined by heating approximately 1 gram of the reaction mixture for 1 hour at the mid-distillation temperature of the 1-olefine starting materials as determined by well-known methods such as described in Specification ASTM D. 1078. For 1-olefine starting materials having 14 to 22 carbon atoms, which tend to have mid-distillation temperatures which are rather high, non-volatile contents are determined at 250°C. It is important for characterisation of the heat-reaction products that the non-volatile contents be determined at the appropriate temperature. While the reactions which occur during the heat treatment are not fully understood at least part of the starting monomeric material becomes converted to relatively low-molecular weight polymeric material of a type which become vaporised at relatively low temperatures so that the non-volatile content determined experimentally is, more than usually in the art, dependent on the temperature at which the determination is made.

The heat-reaction products used in this invention are stable in the sense that they retain their advantageous properties for at least 14 days when stored at ambient temperature.

The level of non-volatile content, and the nature of substantially inert organic solvent if present, are adapted to the end-use to which the heat-reaction product is to be put, and in particular, for securing a satisfactory degree of compatibility with ethylenically unsaturated compounds with which it is to be subsequently co-polymerised. In general, the non-volatile content (as defined) will be in the range of 1 to 60, more usually from 5 to 50 parts by weight per 100 parts of heat-reaction product. Higher non-volatile contents favour good subsequent percentage conversion but may promote incompatibility with other ethylenically unsaturated copolymerisable compounds present in a subsequent copolymer. A generally preferred range is 7 parts to 40 parts by weight per 100 parts of heat-reaction product.

In tests with monomeric starting materials it was found that approximately 1 gram quantities became entirely evaporated when heated for 1 hour at the following temperatures.

Table 2

| 1-octene | 40°C |
|---|---|
| 1-decene | 80°C |
| 1-dodecene | 120°C |
| 1-octadecene | 140°C |

It is an advantage of the 1-olefine heat-reaction products used in the present invention that their presence in the present copolymers has little tendency to cause brittleness. It is necessary, however, that they are selected to provide satisfactory compatibility not only with the other co-monomers when in copolymerised form, but also with any added cross-linking agent that may be used. Preferably the 1-olefine heat-reaction product is prepared from 1-olefines with 6 to 14 carbon atoms per molecule and with a non-volatile content determined at the mid-distillation temperature of the 1-olefine starting material of 5 to 30, most preferably between 8 and 15 percent by weight. Examples of stable 1-olefine heat-reaction product are as follows:

Product A

| 1-Decene | 95.8 |
|---|---|
| Di-tertiary butyl peroxide | 4.2 |
| | 100.0 |

The 1-decene was charged into a reaction vessel fitted with stirrer, thermometer, condenser and means for making addition of liquid during the course of the reaction, and heated to 165°–170°C. A drip-feed of initiator was then started and continued for 1-hour. Characteristics of the 1-decene used were:

| Specific gravity 60°/60°F | | 0.744 |
|---|---|---|
| Normal 1-olefines | at least | 94.6% |
| Mono-olefines | at least | 98.5% |
| Saturated materials | maximum | 1.5% |
| Distillation range 5% over | | 164°C |
| 95% over | | 175°C |
| Mid-distillation temperature | | 169 – 170°C |

The product was a substantially water-white liquid of viscosity less than ½ poise at 25°C and a non-volatile content of 13.4 percent by weight determined by heating approximately 1 gram for 1 hour at the mid-distillation temperature.

Product B

| 1-Decene | 96.7 |
|---|---|
| Di-tertiary butyl peroxide | 3.3 |
| | 100.0 |

The procedure was as described for Product A above except that after heating for 1 hour the non-volatile content was 9.9 percent when determined in the same manner.

Product C

| 1-Decene | 97.2 |
|---|---|
| Di-tertiary butyl peroxide | 2.8 |
| | 100.0 |

The procedure was as described for Product A except that after heating for 1 hour the non-volatile content was 10.8 percent when determined in the same manner.

Product D

| 1-Octene | 98.6 |
|---|---|
| Tertiary butyl per-benzoate | 1.4 |
| | 100.0 |

The 1-octene was charged into a reaction vessel as hereinbefore described and heated to 125°C. A drip feed of initiator was then commenced and completed after 30 minutes. At this point the non-volatile content measured at 123°C was 1.5 percent by weight. The characteristics of the 1-octene used were:

| Specific gravity 60°/60°F | | 0.718 |
|---|---|---|
| Normal 1-olefines | at least | 95.5% |
| Mono-olefines | at least | 98.5% |
| Saturated compounds | maximum | 1.5% |
| Distillation range 5% over | | 118°C |
| 95% over | | 128°C |
| Mid-distillation temperature | | 123°C |

Products E to I

Heat-reaction products were prepared using 1-octene as used in Example 3 and using the same procedure except that the amount of initiator and the time of heating were varied. All initiator was added within 2 hours of the heating temperature being reached.

| | Time of heating | Parts per 100 of initiator | Percent non-volatile |
|---|---|---|---|
| Product E | 1 hour | 2.8 | 4.0 |
| F | 1½ " | 4.2 | 6.2 |
| G | 2 " | 5.6 | 7.8 |
| H | 2½ " | 5.6 | 8.1 |

| Time of heating | Parts per 100 of initiator | Percent non-volatile |
| --- | --- | --- |
| 1   4 " | 5.6 | 7.7 |

Products J – O

Heat-reaction products were prepared in the same manner as in Examples D to I above except that the 1-octene was replaced by 1-dodecene and di-tertiary butyl peroxide replaced tertiary butyl perbenzoate. The temperature of heating was 190°–200°C and volatile contents were determined at 212°–213°C. The characteristics of the 1-dodecene used were:

| | |
| --- | --- |
| Specific gravity 60°/60°F | 0.762 |
| Normal 1-olefines   at least | 93.6% |
| Mono-olefines   at least | 98.5% |
| Saturated compounds maximum | 1.5% |
| Distillation range 5% over | 205°C |
| 95% over | 220°C |
| Mid-distillation temperature | 212–213°C |

| | Time of heating | Parts per 100 of initiator | Percent non-volatile |
| --- | --- | --- | --- |
| Product J | 30 mins. | 1.4 | 11.1 |
| K | 1 hour | 2.8 | 23.1 |
| L | 1½ hours | 4.2 | 32.1 |
| M | 2 hours | 5.6 | 39.5 |
| N | 2½ hours | 5.6 | 42.1 |
| O | 4 hours | 5.6 | 48.5 |

Products P – S

Heat-reaction products were prepared in the same manner as described for Examples J to O above except that 1-dodecene was replaced by 1-octadecene and non-volatile contents were determined at 250°C. The characteristics of the 1-octadecene used were:

| | |
| --- | --- |
| Specific Gravity 60°/60°F | 0.792 |
| Normal 1-olefines | at least 88.6% |
| Mono-olefines | at least 98.5% |
| Saturated compounds | maximum 1.5% |
| Distillation range: | Beyond range of normal methods |

| | Time of heating | Parts per 100 of initiator | Percent non-volatile |
| --- | --- | --- | --- |
| Product P | 30 mins. | 1.4 | 17.3 |
| Q | 1 hour | 2.8 | 34.6 |
| R | 1½ hours | 4.2 | 45.7 |
| S | 2 hours | 5.6 | 55.2 |

With reference to the figures for non-volatile contents tabulated in the third column determined at 250°C, it was found that the 1-octadecene starting material became completely evaporated when approximately 1 gram was heated for 1 hour at 250°C and in fact also at 140°C, leaving residue nil in both cases.

Product T

| | |
| --- | --- |
| 1-Decene | 99.1 |
| Di-tertiary butyl peroxide | 0.9 |
| | 100.0 |

1-Decene of the same quality as used in Example 1 was charged into the same reaction vessel and heated following essentially the same procedure as for Example 1 at 165°–170°C, heating being continued for 40 minutes. The non-volatile content was 2.4 determined at the mid-distillation temperature.

Products U to Y

These were on the basis of Example 19 above except that amounts of initiator and heating times were varied. Nonvolatile contents were determined at the mid-distillation temperature namely 169°–170°C and also at 150°C, both on the freshly prepared heat-reaction products and again after storage for 14 days at ambient temperature.

Results are set out in Table 3. The difference between the figures in the fifth and sixth columns are within experimental error and indicate stability as regards non-volatile content for the heat-reaction products for 14 days.

Table 3

| Product | Time of heating mins. | Initiator Parts per 100 | Percent non-volatile at 169–170°C | Percent non-volatile at 150°C (initial) | Percent non-volatile at 150°C (after 14 days) |
| --- | --- | --- | --- | --- | --- |
| T | 40 | 0.9 | 2.4 | 3.5 | 4.0 |
| U | 80 | 1.8 | 8.6 | 11.3 | 12.1 |
| V | 120 | 2.8 | 15.6 | 19.2 | 18.9 |
| W | 60 | 2.8 | 10.8 | 13.5 | 12.8 |
| X | 90 | 4.2 | 17.9 | 21.4 | 22.0 |
| Y | 120 | 5.6 | 30.6 | 35.0 | 34.8 |

Product Z

A heat-reaction product was prepared from hexane-1 as follows:

| | |
| --- | --- |
| 1-Hexene | 94.4 |
| Di-cyclohexyl perdicarbonate | 5.6 |
| | 100.0 |

1-Hexene mixed with di-cyclohexyl perdicarbonate was charged into the same reaction vessel and heated to 63°C and maintained at 62°–65°C for 1 hour. The non-volatile content was 18.1 determined at the mid-distillation temperature.

The following examples illustrate the preparation of copolymers according to the invention.

EXAMPLE 1

| Part A | |
| --- | --- |
| 1-Decene heat-reaction product (Product A) | 7.19 |
| Part B | |
| Butyl acrylate | 11.40 |
| Acrylic acid | 1.87 |
| Beta-hydroxy propyl methacrylate | 5.95 |
| Styrene | 33.30 |
| Di-tertiary butyl peroxide | 0.48 |
| Tertiary Dodecyl mercaptan | 0.52 |

-continued

| Part C | | |
|---|---|---|
| | Xylene | 30.00 |
| | Di-tertiary butyl peroxide | 0.34 |
| | Xylene | 8.95 |
| | | 100.00 |

Part A was charged into a reaction vessel equipped with condenser, thermometer and stirrer and heated to 145°C. The components of Part B, after having been mixed together, were then added gradually drop-wise over a period of 4 hours. Heating was continued at 145°C and, after 1½ hours half of the peroxide in Part C was added. After a further 1½ hours the remainder of the peroxide was added. After further heating at 145°C for 1½ hours a determination of the solid content showed that an acceptable percentage conversion had been obtained. The remainder of xylene was then added, together with a mixture of butyl alcohol and aromatic hydrocarbon to reduce the solid content to 55 percent by weight.

| | |
|---|---|
| Viscosity at 25°C | 14 poises |
| Acid value (Milligrams of KOH per gram) | 26.8 |
| Percentage conversion | 95.5 |
| Percentage initiator on reactants | 1.34 |

In a control experiment in which the 1-decene heat-reaction product was replaced by butyl acrylate and the process carried out in a known manner using a normal addition of initiator a product with the following characteristics was obtained.

| | |
|---|---|
| Viscosity at 25°C | 20 – 25 poises |
| Solid content | 55 percent |
| Acid value (milligrams of KOH per gram) | 32.5 |
| Percentage conversion | 99.0 |
| Percentage initiator on reactants | 1.0 |

EXAMPLE 2

| Part A | | |
|---|---|---|
| | 1-Decene heat-reaction product (Product B) | 8.74 |
| Part B | | |
| | Styrene | 28.20 |
| | Butyl acrylate | 12.40 |
| | Beta-hydroxy propyl methacrylate | 5.65 |
| | Acrylic acid | 1.69 |
| | Di-tertiary butyl peroxide | 0.47 |
| | Lauryl mercaptan | 0.52 |
| | Xylene | 41.77 |
| Part C | | |
| | Di-tertiary butyl peroxide | 0.56 |
| | | 100.00 |

Part A was charged into the reactor described in Example 1 and heated to 145°C. The components of Part B, after having been mixed together, were added gradually as a drip-feed over a period of 4 hours. Heating was continued at gentle reflux for a further period of 28 hours, the peroxide of Part C being added in five aliquots at intervals of approximately 5 hours, at which stage a test sample indicated substantially complete conversion. A further amount of xylene was then added to reduce the solid content to 55 percent. The properties were:

| | |
|---|---|
| Viscosity at 25°C | 27 poise |
| Percentage conversion | 98 percent |
| Percentage of initiator on reactants | 1.8 percent |

EXAMPLE 3

| Part A | | |
|---|---|---|
| | 1-Decene heat-reaction product (Product C) | 7.04 |
| Part B | | |
| | Styrene | 34.50 |
| | 2-Ethyl hexyl acrylate | 6.66 |
| | Methacrylic acid | 0.34 |
| | Beta-hydroxy propyl methacrylate | 8.95 |
| | Di-tertiary butyl peroxide | 0.19 |
| | Lauryl mercaptan | 0.43 |
| | Xylene | 41.89 |
| | | 100.00 |

Part A was charged into the reactor described in Example 1 and heated to 145°C. The components of Part B were then added as a drip-feed in the manner described, over a period of 4 hours. Heating was then continued for a further period of 14 hours, at which point a test sample indicated substantially full conversion of monomers. After cooling the reaction mixture further xylene was added to give a nominal solid content of 55%.

| | |
|---|---|
| Viscosity at 25°C | 12.5 – 15 poise |
| Solid content | 56 percent |
| Acid value (milligrams KOH/gram) | 9.9 |
| Percentage conversion | 99.8 |
| Percentage initiator on reactants | 0.33 percent |

In this example a reduced content of mercaptan was used and incremental additions of catalyst during the later stages of reaction were not necessary.

Blends with cross-linking agent

Cross-linking agents which come into consideration for use with acrylic copolymers of the present type are found among the following classes: urea-, melamine- and 'phenol' formaldehyde condensates, alkylol alkyl melamines, poly-epoxide compounds and poly-isocyanate condensates.

To exemplify the use of such materials blends were prepared with a mixture of cross-linking agents namely butylated melamine-formaldehyde resin in solution in butyl alcohol/xylene mixture characterised by a viscosity of 22 – 25 poises at a solid content of 60 percent and a poly-epoxide resin of melting point 64°–76°C by the Durrans Mercury method, a viscosity of 0.85–1.65 poise at 25°C as a 40 percent solution in di-ethylene glycol monobutyl ether and an epoxide equivalent in the range 450–525 grams, and a molecular weight of 900.

The mixing proportions on the basis of solid content were as follows:

| | |
|---|---|
| Acrylic copolymer | 73 |
| Butylated melamine-formaldehyde resin | 24 |
| Epoxide resin | 3 |
| | 100 |

Sufficient additional organic solvent was added to reduce the viscosity to about 1½ to 2 poise and the solutions spread by means of a 'bar-coater' on clear glass plates. Samples of the acrylic copolymers, without the addition of cross-linking agent, were reduced to similar viscosities with solvent and applied in the same way. The coated glass specimens were stoved for 30 minutes at 120°C. The hardened coatings were examined with the following results:

|  | Copolymer only | Copolymer with cross-linking agents |
|---|---|---|
| Example 1 | Clear | Clear |
| Example 2 | Clear | Clear |

Deviation from complete clarity in such mixtures tends to indicate a degree of incompatibility between the film-forming components which is undesirable), being liable to give rise to instability and low gloss when pigmented. It has been found, however, that a slight haziness in the solution mixture and a very slight degree of opalescence in the hardened films can frequently be tolerated without detrimental effects.

Pigmented enamels were prepared on the basis of the above blends of copolymer and cross-linking agent as follows:

| | |
|---|---|
| Rutile titanium dioxide pigment | 29.6 |
| Butylated melamine-formaldehyde resin (60% solution) | 12.3 |
| Acrylic copolymer (55% solution) | 39.8 |
| Epoxide resin (solid) | 0.9 |
| Ethylene glycol mono-ethyl ether acetate | 2.0 |
| Butyl alcohol | 9.7 |
| Xylene (approximately) | 5.7 |
| | 100.0 |

The pigment was incorporated in the solution of melamineformaldehyde resin by ball-milling in the manner well known in the art and acrylic copolymer together with epoxide resin, dissolved in a small amount of solvent, being added afterwards, together with the alcohol, glycol ether ester and sufficient xylene to reduce the viscosity to approximately 60 seconds on a Ford No. 4 cup at 21°C.

EXAMPLE 4

Enamel prepared from the acrylic copolymer of Example 1.

EXAMPLE 5

Enamel prepared from the acrylic copolymer of Example 2.

The enamels were applied by a 'spinning' technique to phosphate-treated steel panels and stoved at 120°C for 30 minutes to give hardened coatings of a substantially uniform thickness of about 0.9 to 1.1 mils.

A similar enamel, prepared from the control acrylic copolymer which contained no 1-olefine was applied similarly.

Further applications were made on alternative metal substrates such as tinplate and smooth steel panels appropriate to flexibility, impact and other tests. Test results obtained are set out in Table 4.

Table 4.

| | | Example 4 | Example 5 | Control |
|---|---|---|---|---|
| Appearance | | Smooth, glossy and good colour | | |
| Pencil Hardness | | 3H | 2H | 4H |
| Flexibility 1/4 in. | | Pass | Pass | Pass |
| (mandril) 1/8 in. | | Pass | Pass | Pass |
| 1/16 in. | | Just passed | Failed | Just passed |
| Impact Resistance (Gardner-Ford method) | | | | |
| | Face | - Pass 20 lb/in | Pass 20 lb/in | Pass 30 lb/in |
| | Reverse | - Fail 10 lb/in | Fail 10/lb/in | Fail 10 lb/in |
| Adhesion (Erichsen 'cross-hatch' method) | | 95% | 97% | 95% |
| Alkali resistance | | [on phosphate treated steel panels, half-immersed in boiling 5 percent 'Tide' solution, blistering recorded by the ASTM method in which blister size ranges from 1 (large) to 10 (small)] | | |
| 6 hrs. | | No change | No change | No change |
| 12 hrs. | | No change | No change | One No. 1 |
| 18 hrs. | | A few specks | Two No. 10 | Medium coverage of No. 1 |
| 24 hrs. | | A few No. 10 | Medium No. 10 | Dense No. 1 |
| Stain resistance (24 hours) | | | | |
| Lipstick | | No change | No change | No change |
| Boot polish | | Faint stain | Bad discoloration | No change |
| N/10 iodine solution | | Faint stain | Faint stain | Faint stain. |

EXAMPLE 6

Three comparative resins were prepared on an acrylamide formulation. These three resins were:
a. Basic acrylamide formulation
b. Using 1-olefine monomer
c. Using a 1-olefine heat-reaction product (a) The basic formulation was as follows :

| | | |
|---|---|---|
| Styrene | 9.60 | |
| Ethyl acrylate | 27.70 | |
| Acrylamide | 8.00 | |
| Tert. dodecyl mercaptan | 1.33 | A |
| Cumene hydroperoxide | 0.42 | |
| Xylol | 14.40 | |
| n-Butanol | 14.40 | |
| Cumene hydroperoxide | 0.21 | B |
| n-Butanol | 3.20 | |
| Butanol/formaldehyde solution | 16.70 | C |
| Maleic anhydride | 0.21 | |
| Cumene hydroperoxide | 0.21 | |
| Cumene hydroperoxide | 0.21 | D |
| Cumene hydroperoxide | 0.21 | E |
| Xylol | 3.20 | F |
| | 100.00 | |

Method

Charge A and raise to 100°C. Hold 100°C for 2 hours with occasional cooling to control the initial exotherm.

Add B. Maintain 100°C for further 2 hours. Add C and heat to reflux. Remove water azeotropically. After 2 hours reflux add D. Reflux for further 2 hours removing water continually. Add E. Reflux for further 3 hours. Thin with F.

The properties of this resin (a) were as follows:

| | |
|---|---|
| Non-volatile content | 59.2% |
| Acid value | 2.0 mgs KOH/gm. |
| Viscosity at 25°C | 19 poise (Tube 13A-) |
| Percentage conversion | 98.7% |
| Percentage initiator on reactants | 2.4% | b. Using 1-olefine monomer involved replacing 6.17 parts of ethyl acrylate in part A with an equal amount of octene-1 monomer. Thus the amount of ethyl acrylate used was 21.53 parts. The method of production was exactly the same as for (a). The properties of this resin were as follows:

| | |
|---|---|
| Non-volatile content | 54.5% |
| Acid value | 2.9 |
| Viscosity at 25°C | 7 poise (Tube 11) |
| Percentage conversion | 90.8% |
| Percentage initiator on reactants | 2.4% | c. The use of 1-olefine heat-reaction product involved replacing 6.52 parts of ethyl acrylate in part A with an equal amount of octene-1 heat-reaction product (non-volatiles 8.1%). The amount of ethyl acrylate used was 21.18 parts. 0.35 part of this heat-reaction product was the decomposition products of the free-radical-generating polymerisation initiator used in its preparation.

The method of production was exactly the same as (a) apart from the addition of B which began as soon as part A had reached 100°C and lasted 4 hours. C was then added. The method followed the (a) system from this point. The properties of this resin were as follows:

| | |
|---|---|
| Non-volatile content | 55.7% |
| Acid value | 3.5 |
| Viscosity at 25°C | 8.5 poise (Tube 11A) |
| Percentage conversion | 93% |
| Percentage initiator on reactants | 2.4% |

Paints and Results

These three resins were made into paints using the following paint formula (standard type of formulation used by paint manufacturers).

| | | |
|---|---|---|
| Acrylamide resin (100%) | 95.0 | parts by weight |
| Epoxy resin (100%) | 5.0 | " |
| Rutile titanium dioxide | 90.0 | " |
| Xylol:n-Butanol 1:1 | to application viscosity of 60 secs. No. 4 Ford Cup at 21°C. | |

The paints were applied to phosphate-treated steel panels and stoved for 30 minutes at 175°C. Tests were carried out on these panels. Results are set out in Table 5, from which it can be seen that better detergent resistance was obtained from the olefine heat-reaction product preparation (c) when compared with the two controls.

Table 5

Alkali Detergent Resistance
(Panels immersed at 95–100°C in 5% commercial detergent solution renewed every 6 hours)

| State of panels after | Paint (a) | Paint (b) | Paint (c) |
|---|---|---|---|
| 6 hours | Dense microblisters. Medium discoloration. | Faint discoloration. | Trace discoloration. |
| 12 hours | Dense discoloration. Dense No. 9 blisters + five No. 3 blisters. | Dense discoloration. Medium No. 9–10 blisters. Two No. 5 blisters. | Faint discoloration. Medium microblisters. Eight No. 10 blisters. |
| 18 hours | Breakdown. | Breakdown. | Medium discoloration Medium microblisters. Ten No. 9 blisters. |

EXAMPLE 7

A heat-reaction product was prepared from hexene-1 as follows;

| | |
|---|---|
| 1-Hexene | 94.4 |
| Di-cyclohexyl perdicarbonate | 5.6 |
| | 100.0 |

1-Hexene mixed with dicyclohexyl perdicarbonate was charged into the same reaction vessel and heated to 63°C and maintained at 60°–65°C for 1 hour. The non-volatile content was 18.1 determined at the mid-distillation temperature.

The above product was converted into an acrylic lacquer as follows:

| | | |
|---|---|---|
| Part A | 1-Hexene heat-reaction product | 6.89 |
| Part B | | |
| | Butyl acrylate | 11.41 |
| | Styrene | 33.27 |
| | Acrylic acid | 1.90 |
| | Beta-hydroxy propyl methacrylate | 5.94 |
| | Di-tertiary butyl peroxide | 0.47 |
| | Lauryl mercaptan | 0.52 |
| | Xylol | 38.92 |
| Part C | | |
| | Tert. butyl perbenzoate | 0.68 |
| | | 100.00 |

Part A was charged into the reaction vessel described in Example 1 and heated to 65°C. Part B was added gradually over 4 hours, maintaining the temperature at reflux. Part C was then added in four equal additions at intervals of 90 mins. and heating continued for a further 2 hours (making a total of 12 hours at reflux). At this stage a test sample indicated substantially complete conversion and, after cooling, xylol was added to provide a nominal solid content of 55%.

| | |
|---|---|
| Viscosity at 25°C | 55 poise |
| Solid content | 55.4% |
| Acid value (milligram of KOH per gram) | 30.5 |
| Percentage conversion | 99.2% |
| Percentage initiator on reactants | 1.88% |

When incorporated in a stoving enamel in the manner described in respect of Examples 4 and 5, sprayed and stoved at 150°C for 30 minutes, a hard, glossy coating resulted which failed after immersion in boiling 5% 'Tide' solution for 48 hours. A comparative enamel in which the 1-olefine heat-reaction product had been replaced by acrylic monomers failed after 37 hours immersion.

EXAMPLE 8

This example is a comparative experiment which demonstrates that the maximum practical level of incorporation of 1-olefine heat-reduction product into copolymers according to the present invention is 25%.

Preparation of the 1-olefine heat-reaction product i. 1-decene 95.2 parts of 1-decene having a mild-distillation of 169°–170°C were charged into a reaction vessel equipped with reflux condenser, thermometer, stirrer and a drip-feed for making liquid additions during reaction, and heated to and maintained at between 165° and 170°C. 4.8 parts of di-tertiary butyl peroxide were added via the drip-feed over a period of one hour. The reaction was then stopped by cooling the reaction mixture. The heat-reaction product thus produced had a non-volatile content, determined by heating 1 gm. of the product at 169°–170°C for one hour in air of 12.3%.

ii. 1-dodecene 95.2 parts of 1-dodecene having a mid-distillation temperature of 212°–213°C was charged into a reaction vessel (as in (i)) and heated to and maintained at between 190° and 200°C. 4.8 parts of ditertiary butyl peroxide were added via the drip feed over a period of one hour. The reaction was then stopped by cooling the reaction mixture. The heat-reaction product thus produced had a non-volatile content, determined by heating 1 gm. of the product at 212°–213°C for one hour in air, of 24.4%.

Preparation of acrylic copolymers using the 1-olefine heat-reaction products

Acrylic copolymers were prepared using each of the above heat-reaction products, according to the formulations shown in Table 6. The method of manufacture of the 6 copolymers wasa as follows:

Part A was charged into a reaction vessel equipped with condenser, thermometer and stirrer and heated at 145°C. The components of Part B, after having been mixed together, were added gradually as a drip-feed over a period of four hours. Heating was continued at gentle reflux for a further period of 28 hours, the peroxide of part 'C' being added in equal aliquots at intervals of approximately 1½ hours. At this stage the solid content was determined, by heating 1 gram of the copolymer at 150°C for one hour.

Properties of the acrylic copolymers

The percentage conversion figures for the 6 acrylic copolymers produced above are given in Table 7.

TABLE 6

| | | COPOLYMER A | COPOLYMER B | COPOLYMER C | COPOLYMER D | COPOLYMER E | COPOLYMER F |
|---|---|---|---|---|---|---|---|
| Part A | 1-Decene heat-reaction product. | 9.36 | — | 15.51 | — | 21.63 | — |
| | 1-Dodecene heat-reaction product. | — | 9.36 | — | 15.51 | — | 21.63 |
| Part B | Styrene. | 28.30 | 28.30 | 24.80 | 24.80 | 21.42 | 21.42 |
| | Butyl Acrylate. | 15.58 | 15.58 | 13.65 | 13.65 | 11.83 | 11.83 |
| | Acrylic Acid. | 1.61 | 1.61 | 1.42 | 1.42 | 1.24 | 1.24 |
| | Beta-hydroxy propyl methacrylate. | 5.05 | 5.05 | 4.43 | 4.43 | 3.83 | 3.83 |
| | Tertiary dodecyl mercaptan. | 0.52 | 0.52 | 0.52 | 0.52 | 0.52 | 0.52 |
| | Di-tertiary butyl peroxide. | 0.48 | 0.48 | 0.47 | 0.47 | 0.47 | 0.47 |
| | Xylene. | 36.86 | 36.86 | 36.63 | 36.63 | 36.50 | 36.50 |
| Part C | Di-tertiary butyl peroxide. | 2.24 | 2.24 | 2.57 | 2.57 | 2.56 | 2.56 |
| | | 100.00 | 100.00 | 100.00 | 100.00 | 100.00 | 100.00 |
| | Theoretical Solid Content. | 63.14% | 63.14% | 63.37% | 63.37% | 63.50% | 63.50% |

TABLE 7

| | | Percentage of 1-Olefine Heat-Reaction Product based on the Monomers. | | | |
|---|---|---|---|---|---|
| | 1-Olefine | Excluding Catalyst Residues | Including Catalyst Residues | Monomer Conversion. | Reaction time After Completing The Monomer Feed |
| Copolymer A | 1-Decene. | 15.0% | 15.65% | 97.8% | 21 hours. |
| Copolymer B | 1-Dodecene | 15.0% | 15.65% | 100% | 21 hours. |

TABLE 7-continued

|  | 1-Olefine | Percentage of 1-Olefine Heat-Reaction Product based on the Monomers. | | Monomer Conversion. | Reaction time After Completing The Monomer Feed |
|---|---|---|---|---|---|
|  |  | Excluding Catalyst Residues | Including Catalyst Residues |  |  |
| Copolymer C | 1-Decene. | 25.0% | 25.90% | 95.1% | 28 hours. |
| Copolymer D | 1-Dodecene. | 25.0% | 25.90% | 95.1% | 28 hours. |
| Copolymer E | 1-Decene. | 35.0% | 36.2% | 84.7% | 28 hours. |
| Copolymer F | 1-Dodecene. | 35.0% | 36.2% | 88.5% | 28 hours. |

Three different levels of each oof the two 1-olefine heat-reaction products were examined in acrylic copolymers. As in indicated in Table 7, there are two ways of expressing these levels:
 a. As the amount of 1-olefine heat reaction product as obtained. In this case it should be remembered that the 1-olefine heat-reaction product contains 4.8% of catalyst residues, or
 b. As the amount of 1-olefine (including dimers, trimer etc.) excluding catalyst residues.

Both figures are given in the table as percentages of the total amount of monomer used.

Considering now the results in Table 7:

The copolymers containing 15% 1-Olefine attained a satisfactory percentage monomer conversion of above 95% after a relatively short reaction time.

Satisfactory monomer conversion for the copolymers containing 25% of 1-olefine was more difficult to attain. These copolymers required a lengthy reaction time of 28 hours from completion of the monomer feed.

The copolymers containing 35% 1-olefine exhibited an unsatisfactory percentage monomer conversion after a reaction time of 28 hours. The rate of increase in percentage monomer conversion during this reaction was so low that it became obvious that satisfactory conversion could not be attained using practical reaction times.

Whilst this does not show a sudden 'cut-off' at a level of 25% it does show that all owing for variation between individual formulations 25% is a practical upper limit of incorporation of 1-olefine heat-reaction product if a satisfactory percentage conversion figure is to be attained.

EXAMPLE 9.

An Acrylamide copolymer was made including a heat reaction product of 1-decene. The copolymer obtained was thermosetting without the addition of specific curing agents.

A 1-decene heat-reaction product was made from

|  | |
|---|---|
| 1-decene | 95.2 parts |
| Di-tertiary butyl peroxide | 4.8 parts |
| | 100.0 |

The procedure was as described for Product A and the 1-decene heat-reaction product had a non-volatile content of 24.9%.

The following formulation was made up:

| | | Parts by weight |
|---|---|---|
| A | Styrene | 9.60 |
|   | Ethyl acrylate | 21.18 |
|   | Acrylamide | 8.00 |
|   | Tert. dodecyl mercaptan | 1.33 |
|   | 1-decene heat reaction product | 6.52 |
|   | Cumene hydroperoxide | 0.42 |
|   | Xylol | 14.40 |
|   | n-Butanol | 14.40 |

-continued

| | | Parts by weight |
|---|---|---|
| B | Cumene hydroperoxide | 0.21 |
| C | n-Butanol | 3.20 |
|   | Butanol/formaldehyde solution | 16.70 |
|   | Maleic anhydride | 0.21 |
|   | Cumene hydroperoxide | 0.21 |
| D | Cumene hydroperoxide | 0.21 |
| E | Cumene hydroperoxide | 0.21 |
| F | Xylol | 3.20 |
|   |  | 100.00 |

Part 'A' was charged into a reaction vessel equipped with condenser, thermoeter and stirrer and heated to 100°C.

Part 'B' was added gradually as a feed over 4 hours, maintaining the temperature at 100°C. Part 'C' was added and the reaction mixture was heated to reflux. Water was removed axeotropically. Reflux was continued for two hours, removing water continually. Part 'E' was added. After a further three hours reflux the product was thinned with part 'F'.

The properties of this resin were as follows:

| | |
|---|---|
| Solids Content | 56.0% |
| Percentage monomer conversion | 93.5% |

Film evaluation

This resin was applied to glass panels. One film was allowed to air-dry overnight, followed by a one hour period of drying at 40°C to allow any residual solvent to leave the film. A second film was stoved for 30 minutes in an oven at 175°C. The two films were subjected to tests to determine the hardness and chemical resistance. The results are shown in the following table and indicate that the resin is thermosetting.

|  | Stoved Film | Air dried Film |
|---|---|---|
| Pencil Hardness | 4H | Very soft. Softer than HB |
| Mar Resistance | Excellent | Very poor |
| Toluol Resistance | Softens after 5 minutes | Immediate softening |
| Resistance to 5% sodium hydroxide solution | Good. No Whitening after one hour | Good. Slight whitening |

EXAMPLE 10.

This is an example of a thermoplastic binary copolymer. The 1-decene heat reaction product was as used in Example 9.

|   |   |   | Parts by weight |
|---|---|---|---|
| A | { | 1-decene heat reaction product | 20 |
| B | { | 2-ethyl hexyl acrylate | 80 |
|   |   | Di-tertiary butyl peroxide | 1.07 |
| C | ( | Di-tertiary butyl peroxide | 0.80 |

Part 'A' was charged into a reaction vessel equipped with condenser, thermometer and stirrer and heated to reflux (about 150°C). The mixed components of part 'B' were added gradually as a feed over 2½ hours. Heating was continued at gentle reflux for a further period of 14 hours, the peroxide of part 'C' being added in equal aliquots at intervals of approximately 4 hours. At this stage the solid content was determined by heating 1 gram of the co-polymer at 150°C for one hour.

Solid Content 98.1%

The copolymer had a percentage conversion of 98% of the monomers.

EXAMPLE 11.

The 2-ethyl hexyl acrylate of Example 10 can be replaced with an equal weight of butyl acrylate to give a similar product copolymer at a percentage monomer conversion in excess of 95%.

EXAMPLE 12.

A ternary copolymer of 1-decene heat reaction product (15.6 parts) having a non-volatile content of 24.9% with butyl acrylate (29.9 parts) and styrene (54.5 parts) attained 95.7% monomer conversion after 28 hours heating.

| Formula |   |   | Parts by weight |
|---|---|---|---|
| A | ( | 1-decene heat reaction oriduct | 9.36 |
| B | { | Styrene | 32.62 |
|   |   | Butyl acrylate | 17.92 |
|   |   | Tert. dodecyl mercaptan | 0.52 |
|   |   | Di-tertiary butyl peroxide | 0.48 |
|   |   | Xylol | 36.86 |
| C | ( | Di-tertiary butyl peroxide | 2.24 |
|   |   |   | 100.00 |

Process

Part 'A' was charged into a reaction vessel equipped with condenser, thermometer and stirrer and heated to 145°C. Part 'B' was mixed and added gradually as a drip-feed over a period of four hours. Heating was continued at gentle reflux for a further period of 28 hours, the peroxide of part 'C' being added in equal aliquots at intervals of approximately 1½ hours. At this stage the solid content was determined by heating 1 gram of copolymer at 150°C for one hour.

Solid Content 60.7%

As in Examples 10 and 11 copolymer produced in this example is thermoplastic.

EXAMPLE 13

Using the 1decene heat-reaction product used in Example 9 a terpolymer of the heat-reaction product (10 parts) with vinyl acetate (40 parts) and 2-ethyl hexyl acrylate (50 parts) attained 96 % monomer conversion after 36 hours reaction time.

| Formula |   |   | Parts by weight |
|---|---|---|---|
| A | { | 1-decene heat reaction product | 4.89 |
|   |   | Isopropyl acetate | 15.24 |
|   |   | Isopropyl alcohol | 0.33 |
| B | { | Vinyl acetate | 19.54 |
|   |   | 2-ethyl hexyl acrylate | 24.53 |
|   |   | Isopropyl acetate | 26.90 |
|   |   | Isopropyl alcohol | 0.83 |
|   |   | Benzoyl peroxide (66% paste) | 0.26 |
| C | { | Isopropyl acetate | 2.74 |
|   |   | Benzoyl peroxide (66% paste) | 0.26 |
| D | { | Isopropyl acetate | 2.74 |
|   |   | Benzoyl peroxide (66% paste) | 0.26 |
| E | ( | Benzoyl peroxide (66% paste) | 1.48 |
|   |   |   | 100.00 |

Part 'A' was charged into a reaction vessel equipped with condenser, thermometer and stirrer and heated to 80°C. Part 'B' was added gradually over 4 hours as a drip feed, maintaining the temperature at reflux. One hour after completing 'B' addition, part 'C' is added over 30 minutes, maintaining the reaction temperature at reflux. One hour after completing 'C' addition, part 'D' is added over 30 minutes. The reaction mixture is maintained at reflux for a further 28 hours, the peroxide of part 'E' being added in equal aliquots at intervals of approximately two hours.

At this stage, the solid content was determined, by heating 1 gram of the copolymer at 150°C for one hour.

Solids Content 49.3%

EXAMPLE 14.

The 2-ethyl hexyl acrylate of Example 13 can be replaced with an equal weight of butyl acrylate to give a similar result at a percentage conversion of about 96%

Examples 13 and 14 illustrate that vinyl acetate can be substituted where desired for the styrene or vinyl toluene used elsewhere. However, as noted previously the volatility of the vinyl acetate means that, unless the reaction vessel is pressurised, the reaction temperature is generally lower and this may recessitate longer reaction times.

EXAMPLE 15.

A copolymer of 1-decene heat reaction product (15.6 parts) having a non-volatile content of 24.9% with dioctyl maleate (26 parts), styrene (47.3 parts), hydroxy propyl methacrylate (8.4 parts) and acrylic acid (2.7 parts) attained 96.1% monomer converstion after 28 hours heating.

| Formula |   |   | Parts by weight |
|---|---|---|---|
| A | ( | 1-decene heat reaction product | 9.36 |
| B | { | Styrene | 28.30 |
|   |   | Dioctyl maleate | 15.58 |
|   |   | Acrylic acid | 1.61 |
|   |   | Beta-hydroxy propyl methacrylate | 5.05 |
|   |   | Tertiary dodecyl mercaptan | 0.52 |
|   |   | Di-tertiary butyl peroxide | 0.48 |
|   |   | Xylol | 36.86 |
| C | ( | Di-tertiary butyl peroxide | 2.24 |
|   |   |   | 100.00 |

Process

The process was as outlined in Example 12.

Solids Content 60.8%

This Example shows that in this invention di-esters of maleic, fumaric and itaconic acids behave similarly to acrylic and methacrylic esters in that they can be incorporated in the copolymers of the invention in fairly large quantities.

EXAMPLE 16

This Example further illustrates the possibilities of copolymerising 1-olefine heat-reaction products with reactive momomers.

A copolymer of 1-decene heat reaction product (12 parts having a non-volatile content of 24.9% with hydroxy ethyl acrylate (10 parts), styrene (53.2 parts), butyl acrylate (16.6 parts), acrylonitrile (5parts) and acrylic acid (3.2 parts) attained 98% monomer conversion after 28 hours heating.

The 1-olefine heat-reaction product was charged into a reaction vessel of the type hereinbefore described and heated with stirring to approximately 140°–145°C. A mixture of the monomers, peroxide initiator and xylene were added drop-wise over a period of 1½ hours, the contents of the vessel being maintained under conditions of gentle reflux, stirring being continued. Heating was continued until no further increase in viscosity took place, the viscosity being measured on a small sample removed from the flask and cooled to 21°C. Weight percentage conversion figures were obtained by heating approximately one gram of the reaction mixture to constant weight at 150°C, the theoretical maximum being 58 percent. Various samples of 1-olefine heat-reaction product were used, the results in respect of solid content, percentage conversion and viscosity being set out in Table 8.

For test purposes further xylene was added to the solution polymers to reduce their viscosity to 2 – 3 poises at ambient temperature and coatings of normal varnish thickness were applied to clear glass substrates and allowed to dry at ambient temperature.

Table 8

| Copolymer | | 1-olefine heat-reaction product | | | Non-volatile content of heat-reaction product at 150°C | Percentage conversion | Condition of dry coatings |
|---|---|---|---|---|---|---|---|
| Example | 17 | Product | T | — freshly prepared | 3.6 | 89.5 | Clear |
| " | 18 | " | U | " | 11.3 | 94.3 | Clear |
| " | 19 | " | V | " | 19.2 | 97.2 | Clear |
| " | 20 | " | W | " | 13.5 | 88.5 | Clear |
| " | 21 | " | X | " | 21.4 | 93.1 | Clear |
| " | 22 | " | Y | " | 35.0 | 97.2 | Slightly opalescent |
| " | 23 | " | V | — aged 7 days | 19.2 | 95.9 | Clear |
| " | 24 | " | V | — aged 14 days | 19.2 | 95.8 | Clear |
| " | 25 | " | Y | — aged 7 days | 35.0 | 97.3 | Slightly opalescent |
| " | 26 | " | Y | aged 14 days | 35.0 | 96.2 | Slightly opalescent |

| | | Parts by weight |
|---|---|---|
| A | ( 1-decene heat reaction product | 7.00 |
|   | Hydroxy ethyl acrylate | 5.85 |
|   | Xylol | 38.30 |
|   | Styrene | 31.30 |
|   | Butyl acrylate | 9.76 |
| B | Acrylic acid | 1.87 |
|   | Acrylonitrile | 2.92 |
|   | Di-tertiary butyl peroxide | 0.47 |
|   | Lauryl mercaptan | 0.29 |
| C | ( Di-tertiary butyl peroxide | 2.24 |
|   | | 100.00 |

Process

The method of manufacture was exactly as that for for Example 12.

Solids Content 60.5%

EXAMPLES 17 TO 26

These comprise a series of Examples performed along similar lines but using differing heat-reaction products. Samples of solution acrylic copolymers were prepared according to the following basic formulation:

| 1-olefine heat-reaction product | 7.10 |
|---|---|
| Styrene | 34.60 |
| 2-Ethyl hexyl acrylate | 6.70 |
| Methacrylic acid | 0.35 |
| Beta-hydroxy propyl methacrylate | 8.90 |
| Di-tertiary butyl peroxide | 0.19 |
| Xylene | 42.16 |
| | 100.00 |

It can be seen that, in the particular type of copolymer investigated, a non-volatile content in the 1-olefine heat-reaction product of 35 percent determined at 150°C (corresponding to 30.6 percent at the mid-distillation temperature) appears to be too high, in that slightly opalescent dry coatings of copolymer were obtained. The precentage conversion figures for the final copolymer however were quite satisfactory with 1-olefine heat-reaction product freshly prepared (Examples 22) or aged for 7 (Example 25) or 14 days (Example 26). The best balance between film clarity and percentage conversion for this particular copolymer (Examples 19, 23 and 24) appears to be given by the 1-olefine heatreaction product of Product V), which had a non-volatile content determined at 150°C of 19.2 percent (corresponding to 15.6 percent at the mid-distillation temperature). It is to be noted that satisfactory conversion figures were again obtained with 1-olefine heat-reaction products aged 7 and 14 days. Examples 17 and 20 have percentage conversion figures which are marginal from a commercial point of view. The conversion figures can be improved to an adequate commercial level by using heat-reaction products having slightly higher non-volatile contents. Despite the marginal performance with regard to conversion the films made from the copolymers of these two Examples have satisfactory compatibility giving clear films.

We claim:

1. A random copolymer for coating or film-forming application consisting essentially of units of:
1. 1 to 25% of a 1-olefine heat reaction product, made by heating one or more normally liquid 1-monoolefines having from 6 to 22 carbon atoms per molecule in the presence of from 0.5 to 10% by weight on the heat-reaction product of one or more free-radical generating polymerisation initiators, unitl the product has a non-volatile content, determined at the mid-distillation point at the 1-monoolefines, or at 250°C, whichever is lower, of from 1 to 60 parts by weight per 100 parts by weight of heat-reaction product;
2. 0 to 25% of a monomer selected from the group consisting of acrylamide, methacrylamide and N-alkylol derivatives thereof, and hydroxyethyl and hydroxypropyl acrylates and methacrylates and mixtures thereof;
3. 0 to 8% of an ethylenically unsaturated monomer selected from the group consisting of mono- and di-carboxylic acids, mono-esters of dicarboxylic acids with $C_1$ to $C_{10}$ aliphatic or cycloaliphatic monohydric alcohols, nitriles of monocarboxylic acids and mixtures thereof;
4. 0 to 60% of a monomer selected from the group consisting of styrene, vinyl toluene, vinylacetate and mixtures thereof;
5. the balance, to a total of 100%, consisting of one or more copolymerisable monomers selected from the group consisting of esters of acrylic and/or methacrylic acids with $C_1$ to $C_{10}$ aliphatic or cycloaliphatic monohydric alcohols and mixtures thereof;

the percentages of the components 1 to 4 being by weight on the weight of the copolymer.

2. A copolymer as claimed in claim 1 wherein component (1) is a heat-reaction product having a non-volatile content of from 8 to 15 parts by weight per 100 parts by weight heat-reaction product.

3. A copolymer as claimed in claim 1 consisting of:
1. 1 to 25% of a heat-reaction product of 1-decene, made as defined in claim 1,
2. 5 to 25% of beta-hydroxy propyl methacrylate
3. 0 to 8% of methacrylic acid, and
4. the balance of 2-ethylhexylacrylate and styrene.

4. A random copolymer for coating or filmforming application consisting essentially of units of:
1. 1 to 25% of a 1-olefine heat-reaction product, made by heating one or more normally liquid 1-monoolefines, having from 6 to 22 carbon atoms per molecule, in the presence of from 0.5 to 10% by weight of the heat reaction product of one or more free-radical generating polymerisation initiators, until the product has a non-volatile content, determined at the mid-distillation point of the 1-monoolefines, or at 250° C, whichever is lower, of from 1 to 60 parts by weight of heat-reaction product;
2. 0 to 25% of a monomer selected from the group consisting of acrylamide, methacrylamide and N-alkylol derivatives thereof, and hydroxypropyl acrylates and methacrylates and mixtures thereof;
3. 0 to 8% of an ethylenically unsaturated monomer selected from the group consisting of mono- and di-carboxylic acids, mono-esters of di-carboxylic acids with $C_1$ to $C_{10}$ aliphatic or cycloaliphatic momohydric alcohols, nitriles of monocarboxylic acids and mixtures thereof;
4. 0 to 60% of a monomer selected from the group consisting of styrene, vinyl toluene, vinyl acetate and mixtures thereof;
5. the balance, to a total of 100%, consisting of one or more copolymerisable monomers selected from the group consisting of esters of acrylic and methacrylic acids and di-esters of maleic, fumaric and itaconic acids, with $C_1$ to $C_{10}$ aliphatic and cycloaliphatic monohydric alcohols, and mixtures thereof:

the percentages of the components 1 to 4 being by weight on the weight of the copolymer.

5. A process for the preparation of the copolymer claimed in claim 1 which process comprises reacting together, in the presence of free-radical generating polymerisation initiator added gradually during the course of the reaction:
1. 1 to 25% of a 1-olefine heat reaction product, made by heating one or more normally liquid 1-monoolefines having from 6 to 22 carbon atoms per molecule in the presence of from 0.5 to 10% by weight on the heat-reaction product of one or more free-radical generating polymerisation initiators until the product has a non-volatile content, determined at the mid-distillation point of the 1-monoolefine, or at 250° C, whichever is lower, of from 1 to 60 parts by weight per 100 parts by weight of heat-reaction product;
2. 0 to 25% of a monomer selected from the group consisting of acrylamide, methacrylamide and N-alkylol derivatives thereof, and hydroxyethyl and hydroxypropyl acrylates and methacrylates and mixtures thereof:
3. 0 to 8% of an ethylenically unsaturated monomer selected from the group consisting of mono- and di-carboxylic acids, mono-esters of dicarboxylic acids with $C_1$ to $C_{10}$ aliphatic or cycloaliphatic monohydric alcohols, nitriles of monocarboxylic acids and mixtures thereof;
4. 0 to 60% of a monomer selected from the group consisting of styrene, vinyl toluene, and vinyl acetate and mixtures thereof;
5. the balance, to a total of 100%, consisting of one or more copolymerisable monomers selected from the group consisting of esters of acrylic and/or methacrylic acid with $C_1$ to $C_{10}$ aliphatic or cycloaliphatic monohydric alcohols, and mixtures thereof;

all percentages being by weight based on the combined weight of the reactants.

6. A process as claimed in claim 5 wherein a chain-transfer agent is included in the reaction mixture in an amount of from 0.02% to 2.0% by weight on the combined weight of the reactants.

7. A process for the preparation of the copolymer claimed in claim 4 which process comprises reaction together, in the presence of free radical generating polymerisation initiator added gradually during the course of the reaction,
1. 1 to 25% of a 1-olefine heat-reaction product, made by heating one or more normally liquid 1-monoolefines, having from 6 to 22 carbon atoms per molecule, in the presence of from 0.5 to 10.1 by weight on the heat-reaction product of one or more free-radicals generating polymerisation initiators, until the product has a non-volatile content, determined at the mid-distillation point of the 1-monoolefines or at 250°C, whichever is lower, of from 1 to 60 parts of weight per 100 parts by weight of heat-reaction product;

2. 0 to 25% of a monomer selected from the group consisting of acrylamide, methacrylamide and N-alkylol derivatives thereof, and hydroxyethyl and hydroxypropyl acrylates and methacrylates and mixtures thereof;
3. 0 to 8% of an ethylenically unsaturated monomer selected from the group consisting of mono and di-carboxylic acids, mono-esters of di-carboxylic acids with $C_1$ to $C_{10}$ aliphatic or cycloaliphatic monohydric alcohols, nitriles of monocarboxylic acids and mixtures thereof;
4. 0 to 60% of a monomer selected from the group consisting of styrene, vinyl toluene, vinyl acetate and mixtures thereof;
5. the balance, to a total of 100%, consisting of one or more copolymerisable monomers selected from the group consisting of esters of acrylic and methacrylic acids and di-esters of maleic, fumaric and itaconic acids with $C_1$ to $C_{10}$ aliphatic and cycloaliphatic monohydric alcohols, and mixtures thereof;

all percentages being a weight based on the combined weight of the reactants.

8. A process as claimed in claim 7 wherein a chain-transfer agent is included in the reaction mixture in an amount of from 0.02% to 2.0% by weight on the combined weight of the reactants.

* * * * *